United States Patent [19]

de Lange

[11] Patent Number: 4,488,739
[45] Date of Patent: Dec. 18, 1984

[54] INSULATING PIPE PART

[75] Inventor: Tinus de Lange, Vroomshoop, Netherlands

[73] Assignee: Wavin B.V., Zwolle, Netherlands

[21] Appl. No.: 348,207

[22] Filed: Feb. 12, 1982

[30] Foreign Application Priority Data

Feb. 17, 1981 [NL] Netherlands ............ 8100776

[51] Int. Cl.³ .............. F16L 59/16; F16L 41/00; F16L 25/00; F16L 21/00
[52] U.S. Cl. .................... 285/55; 285/156; 285/381; 285/419; 285/373; 138/149; 138/151
[58] Field of Search ............ 285/55, 47, 156, 53, 285/381, 419, 325, 373; 138/151, 156, 149

[56] References Cited

U.S. PATENT DOCUMENTS

| 3,191,632 | 6/1965 | Keiding | 138/151 |
| 3,192,377 | 6/1965 | Abolins | 285/156 X |
| 3,453,716 | 7/1969 | Cook | 285/47 X |
| 3,575,214 | 4/1971 | Bindel | 138/149 X |
| 3,744,823 | 7/1973 | Muir et al. | 285/47 X |
| 4,259,981 | 4/1981 | Busse | 285/47 X |

Primary Examiner—Richard J. Scanlan, Jr.
Attorney, Agent, or Firm—Wilkinson, Mawhinney & Theibault

[57] ABSTRACT

An insulating pipe part of thermoplastic material comprises two opposite sections and one third section disposed at an angle with respect to the former sections, the wall portion of said sections being provided with a continuous wall cutting slit. The pipe part may comprise thicker parts of a polyurethan foam.

For forming an insulated branch pipe joint, said insulating pipe part is pushed over a branch pipe and subsequently plastic sleeves with beveled front ends are heat-shrunk on to said sections, thereby closing said slit in a moisture tight manner.

In order to obtain a reliable moisture tight closing, the sleeves are provided with beveled front ends so that the lower sleeve ends overlap each other.

1 Claim, 5 Drawing Figures

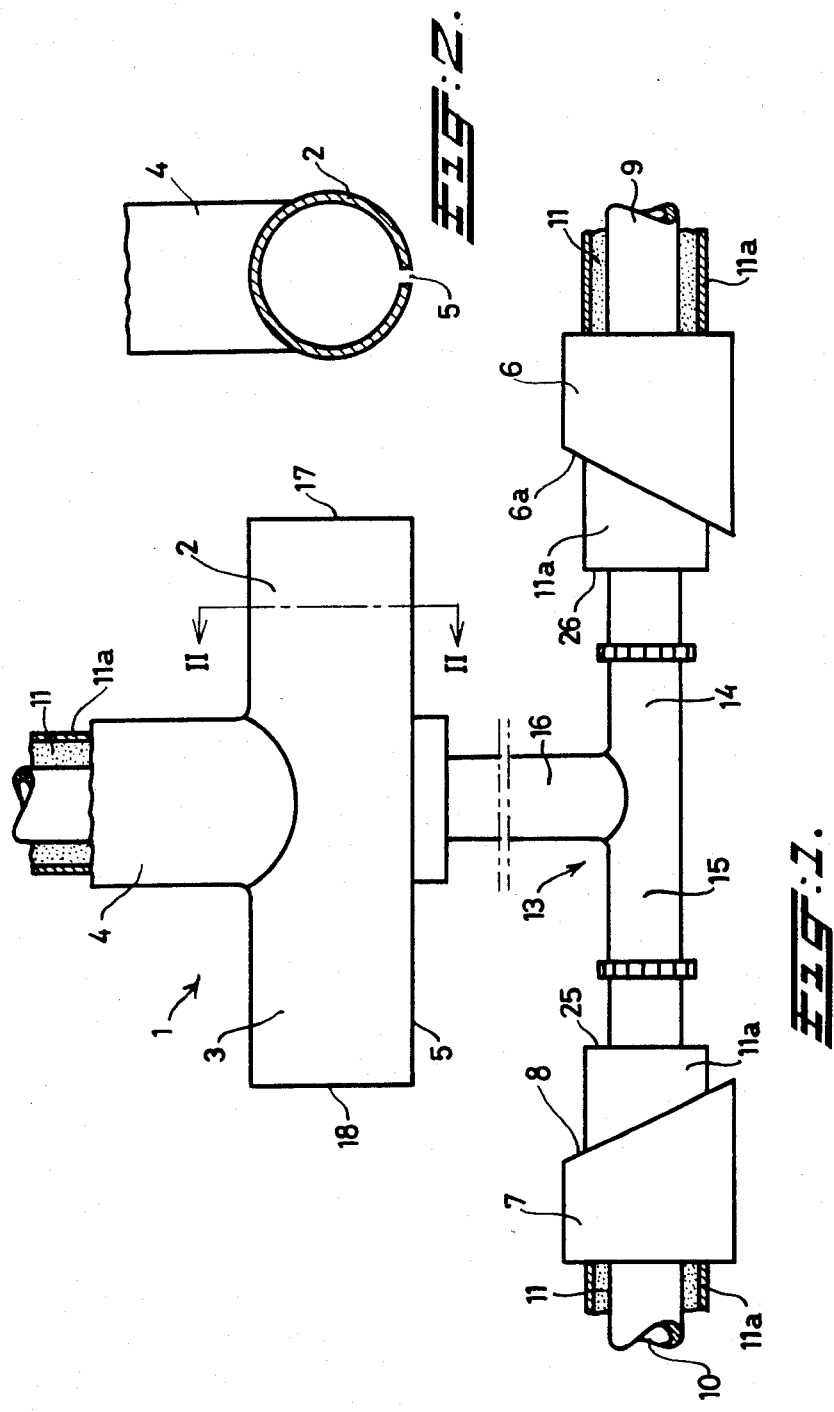

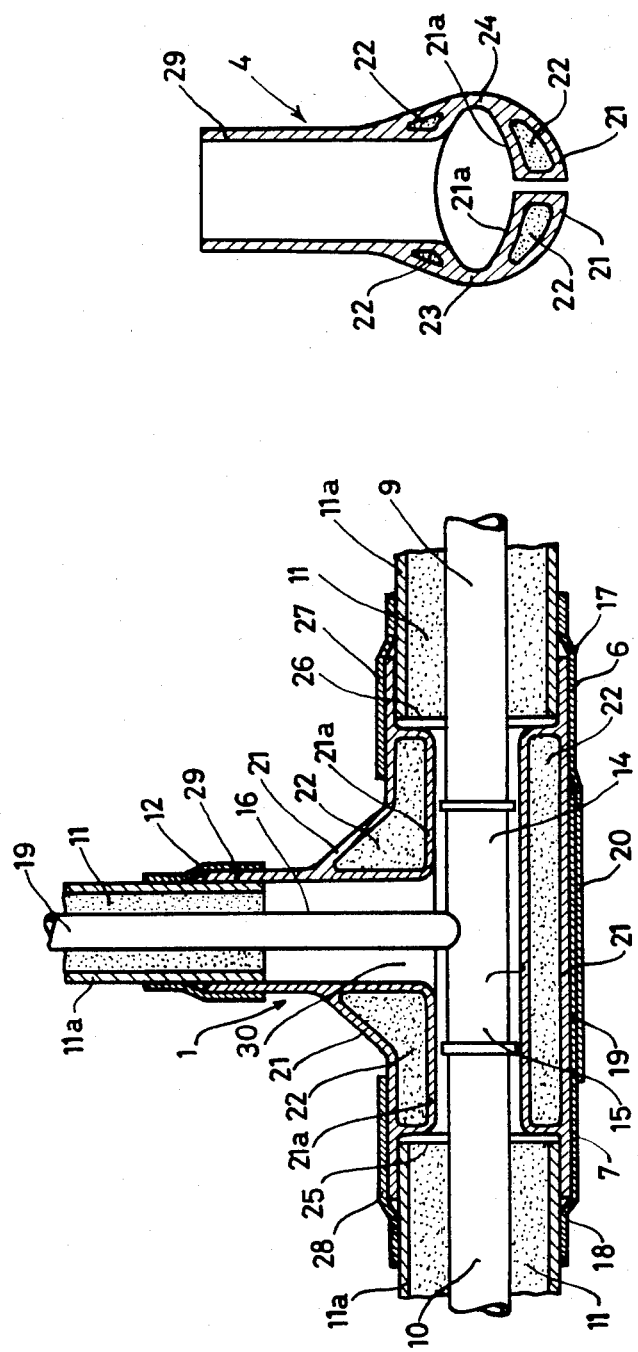

INSULATING PIPE PART

BACKGROUND OF THE INVENTION

1. Field of the Invention

The present invention relates to an insulating pipe part adapted to insulate a branch pipe part.

2. Description of the Prior Art

It is known in the art to insulate branch pipe parts by mounting insulating shell parts with sealing materials around said branch pipe parts. A drawback of such shell parts is that mounting is quite laborious and has to be executed by skilled workers, while, in addition, securing shell parts relative to each other requires special provisions.

SUMMARY OF THE INVENTION

It is therefore a primary object of the present invention to provide an insulating pipe part adapted to insulate a branch pipe part not presenting the aforementioned drawbacks.

This object is attained according to the invention in that the insulating pipe part comprises at least two insulating pipe part sections opposite each other and a third insulating branch pipe part section disposed at an angle with respect to said two insulating pipe part sections, the portion of the wall opposite the insulating branch pipe part section located between the free ends of said two insulating pipe part sections being provided with a continuous wall cutting slit, the third insulating branch pipe part section having the closed wall, being integral with the two other insulating pipe part sections disposed opposite each other.

Such an insulating pipe part presents the great advantage that it can be mounted around a branch pipe part very easily be bending the walls of the insulating pipe part on either side of the slit outwardly, and by subsequently placing them over the branch pipe part, thus eliminating the need for accurate juxtaposing of insulating shell parts.

After mounting such an insulating pipe part, said wall cutting slit can be very easily closed off on the outside so as to prevent a penetration of moisture.

According to a particular embodiment, the plastic insulating pipe part is relatively thin-walled.

In a very advantageous embodiment, the insulating pipe part consists of an insulating foam plastic, particularly an integral foam having closed surfaces, more specifically polyurethane foam.

The present invention is also embodied in an insulated branch pipe joint comprising a branch pipe part having two branch pipe part stubs disposed opposite each other and a third branch pipe part stub being connected therewith and provided with an insulating casing, said insulating casing being composed of an insulating pipe part having a continuous wall cutting slit provided in the wall portion opposite a third insulating branch pipe part section, the wall cutting slit being closed in a moisture tight manner.

To this end, preferably, on each of the two opposed insulating pipe part sections there are provided sleeves which clampingly cooperate with said insulating pipe part sections thereby sealing said wall cutting slit in a moisture tight manner.

The sleeves advantageously are heatshrunk sleeves of thermoplastic material.

The features of the present invention which are believed to be novel are set forth with particularity in the appended claims.

Other claims and many of the attendant advantages will be more readily appreciated as the same becomes better understood by reference of the following detailed description and considered in connection with the accompanying drawings in which like reference symbols designate like parts throughout the figures.

DESCRIPTION OF THE DRAWINGS

FIG. 1 is an insulating pipe part according to the present invention;

FIG. 2 is a cross-sectional view according to line II—II in FIG. 1;

FIG. 4 is a modified embodiment of a finished insulated branch pipe joint of the invention;

FIG. 5 is a cross-sectional view of a modified embodiment of an insulating pipe part according to the invention.

DESCRIPTION OF THE PREFERRED EMBODIMENTS

Figure 3:
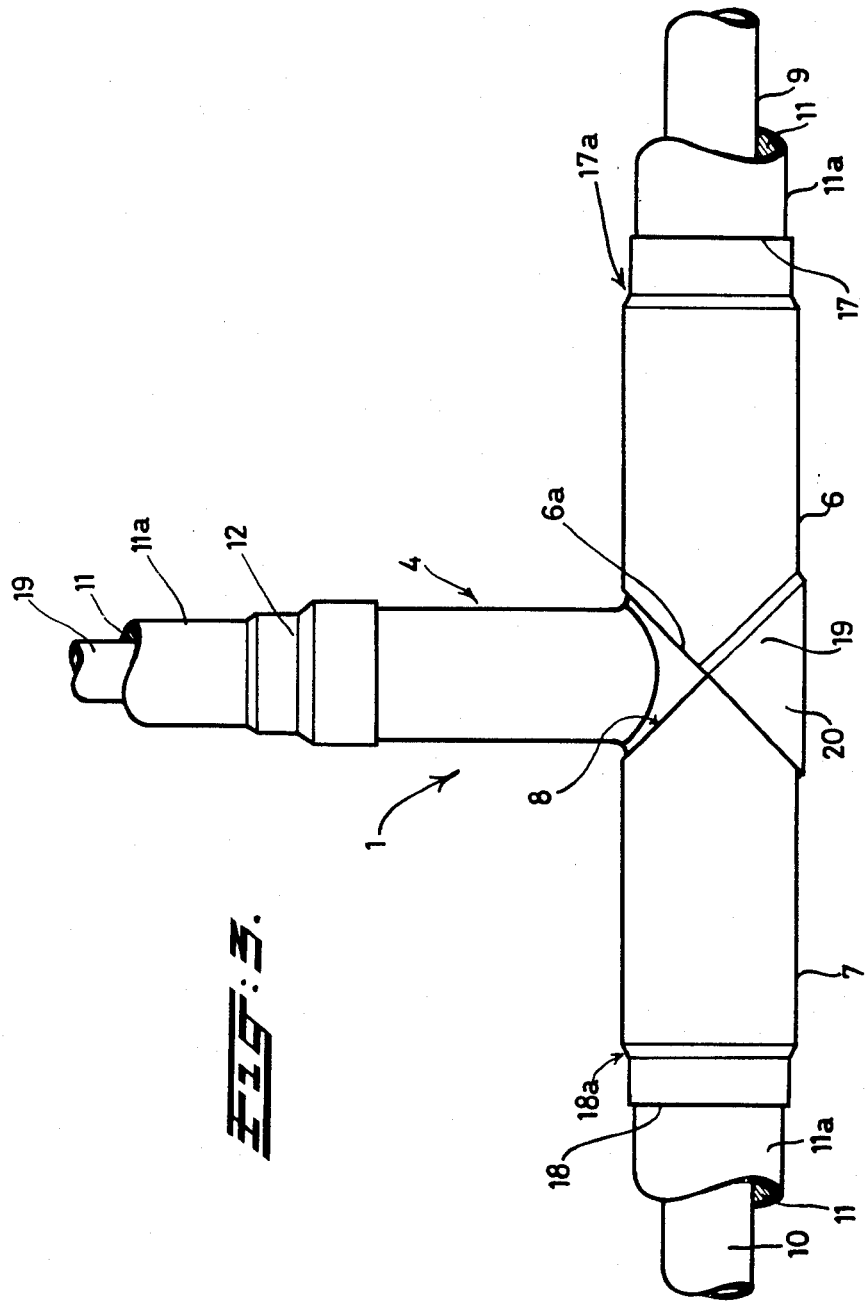
FIG. 3 is a finished insulated branch pipe joint according to the invention.

Referring now to FIG. 1 an insulating pipe part 1 comprises two opposite insulating pipe part sections 2 and 3 and a third insulating branch pipe part section 4 extending perpendicularly thereto. The wall of the third insulating branch pipe part section 4 is provided with a closed wall and is integral with the walls of said two opposed insulating pipe part sections 2 and 3 which also form together one continuous wall.

The bottom side is provided with a continuous slit extending between the free ends 17 and 18 of the two opposed insulating pipe part sections 2, 3.

In order to install such an insulating pipe part on to a branch pipe part 13 comprising two opposed branch pipe part stubs 14, 15 and a third branch pipe part stub 16 connected thereto, the lower part of the insulating pipe part 1 is bent open along the continuous slit 5 and the whole is simultaneously pushed down over the third branch pipe part stub 16 until the insulating pipe part sections 2, 3 enclose the branch pipe part stubs 14, 15.

In order to prevent a penetration of moisture into the insulating pipe part 1, a sleeve 6, 7 of thermoplastic material having a beveled front 6a, 8 is applied over each insulating pipe part section 2, 3 which are opposite each other.

Thereupon, said sleeves 6, 7 are pushed over the insulating pipe part sections 2, 3 until their lower sleeve portions overlap each other, thus ensuring optimum closing of the continuous slit 5 when the sleeves 6, 7 are heatshrunk on to the insulating pipe part sections 2, 3.

Finally, a third sleeve 12 is heatshrunk so that the sleeve 12 clampingly cooperates with the outer side of the tubular casing 11a around the insulating layer 11 on the third pipe conduit being connected with the third branch pipe part section 4 of the insulating pipe part.

As already indicated sleeve 6 is beveled on its front side by a beveling 6a, sleeve 7 also having a beveling 8, both preferably at an angle of 45°.

The beveled portions are such that at least half of the insulating pipe part portion comprising the sections 2 and 3 is enclosed, due to an overlap of the sleeve end parts 19 and 20 of the sleeves 6 and 7.

The sleeves 6 and 7 are pushed over the sections 2 and 3 until substantially abutting the third section 4.

The sleeves 6, 7 and 12 consisting of a thermoplastic material, preferably polyethylene or polypropylene, are heatshrunk on to the sections 2, 3 and 4 of the insulating pipe part 1 and, on the other hand, on the outer side of the tubular casings 11a around the insulating layers 11 on the pipe conduits 9, 10 and 19.

Thus, an excellent closing of slit 5 is obtained.

The sleeves 6, 7 and 12 are advantageously provided on their inner side with a covering layer of bitumen.

Space 30 enclosed by the insulating pipe part sections 2 and 3 as well as the insulating branch pipe part section 4, can be filled with an insulating material such as foam plastic which is formed within said space 30 in situ. It is, however, also possible to place T-shaped insulating half shells of insulating material prior to mounting the insulating pipe part.

Referring now to FIGS. 4 and 5 in a modified embodiment of an insulating pipe part according to the invention, the walls of the insulating pipe part sections 2, 3 and 4 consist partially of foam plastic 22 having closed surfaces 21 and 21a. The foam plastic 22 having the closed surfaces 21, 21a consists of a polyurethan foam.

In order to bend the insulating pipe part sections 2 and 3 outwardly along slit 5, the walls 23 and 24 of the insulating pipe part sections 2 and 3 must be thin.

The foam parts 22 are integral and partially extend over the length of the sections 2 and 3 and section 4. The length of the insulating pipe part measured between the free ends 17 and 18 is greater than the distance between the free front faces 25 and 26 of the insulating layers 11 on conduits 9 and 10, so that in the finished pipe joint said free ends 17, 18 are engaging the tubular casings 11a. However, due to the rather small wall thickness of the insulating polyethylene pipe part, this will not involve unacceptable protuberances 17a, 18a.

In order to achieve this in the case of an insulating pipe part of integral foam, the free ends 27, 28 and 29 of the sections 2, 3 and 4 of integral foam must be thin-walled (see FIG. 4).

Space 30 enclosed by sections 2, 3 and 4 in which space the branch pipe part is located, need not be filled up with insulating material, as the heat losses remain small in such a case as well.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. An insulated branch pipe joint comprising a central branch pipe part having two lateral branch pipe part stubs disposed opposite each other and a complemental third branch pipe part section being connected therewith and providing an insulating casing, said insulating casing being composed of an insulating pipe part having a continuous wall part having a slit provided in the bottom wall portion opposite said central branch pipe part, said third insulating branch pipe part section having a central closed wall and being integral with the walls of the two opposed insulating pipe part sections, each of the two opposed insulating pipe part sections being provided with sleeves of thermoplastic material preferably polyolefins heat shrunk clampingly engaging the two branch pipe part stubs, each said sleeve being provided with a beveled front end in a manner so that each overlaps the opposite sleeve in the wall portion of the insulating pipe part having the slit thereby closing the slit moisture tight.

* * * * *